United States Patent
Sridhar

(10) Patent No.: US 9,143,632 B2
(45) Date of Patent: Sep. 22, 2015

(54) METHOD FOR SIGNALING A FACSIMILE PASS THROUGH MODE OVER A VOIP VOICE SERVICE

(75) Inventor: Sriram Sridhar, Lowell, MA (US)

(73) Assignee: ARRIS Technology, Inc., Suwanee, GA (US)

( * ) Notice: Subject to any disclaimer, the term of this patent is extended or adjusted under 35 U.S.C. 154(b) by 321 days.

(21) Appl. No.: 13/088,771

(22) Filed: Apr. 18, 2011

(65) Prior Publication Data

US 2012/0262762 A1 Oct. 18, 2012

(51) Int. Cl.
| | |
|---|---|
| *H04N 1/32* | (2006.01) |
| *H04N 1/00* | (2006.01) |
| *H04N 1/327* | (2006.01) |
| *H04M 15/00* | (2006.01) |
| *H04N 1/34* | (2006.01) |

(52) U.S. Cl.
CPC .......... *H04N 1/00214* (2013.01); *H04M 15/56* (2013.01); *H04M 15/63* (2013.01); *H04N 1/32765* (2013.01); *H04N 1/32789* (2013.01); *H04N 1/34* (2013.01)

(58) Field of Classification Search
CPC . H04M 2201/52; H04M 15/63; H04M 15/56; H04N 1/00214; H04N 1/32765; H04N 1/32789; H04N 1/34
USPC .................................. 370/252, 253, 352–356
See application file for complete search history.

(56) References Cited

U.S. PATENT DOCUMENTS

| | | | | |
|---|---|---|---|---|
| 5,717,493 | A * | 2/1998 | Ozawa et al. ................. | 358/403 |
| 6,754,232 | B1 | 6/2004 | Tasker | |
| 6,987,821 | B1 * | 1/2006 | Li ................................. | 375/345 |
| 8,031,360 | B2 | 10/2011 | Kirchhoff | |
| 2003/0193696 | A1 * | 10/2003 | Walker et al. ................. | 358/402 |
| 2004/0213286 | A1 * | 10/2004 | Jette et al. ..................... | 370/466 |
| 2005/0047422 | A1 | 3/2005 | Chen | |
| 2007/0076751 | A1 * | 4/2007 | Garcia-Martin et al. ..... | 370/466 |
| 2007/0297424 | A1 * | 12/2007 | Xia ............................... | 370/400 |
| 2008/0088884 | A1 * | 4/2008 | Nakagawa ..................... | 358/400 |
| 2009/0162056 | A1 * | 6/2009 | Merritt ............................ | 398/38 |
| 2011/0242606 | A1 | 10/2011 | Bloomfield | |

OTHER PUBLICATIONS

Cisco Systems, Inc. "Cisco IOS Fax Services over IP Configuration Guide", Release 12.3(1), Mar. 2004.*
RFC 2833, "RTP Payload for DTMF Digits, Telephony Tones and Telephony Signals", published on May 2000.*
"Fax, Modem, and Text for IP Telephony", Chap. 4, Passthrough, Cisco Press, 2008.*

* cited by examiner

*Primary Examiner* — Khaled Kassim
*Assistant Examiner* — Zhaohui Yang
(74) *Attorney, Agent, or Firm* — Lori Anne D. Swanson

(57) ABSTRACT

A method (250) for signaling a facsimile pass through mode over a voice over internet protocol voice service is disclosed. The method (250) includes: establishing (260) a voice over internet protocol call; detecting (270) that a facsimile tone has been received by a sender; and sending (280) a facsimile pass through notify message, from the sender, in response to detecting that the facsimile tone has been received. Advantageously, the method 250 can be adapted to inform the voice over internet protocol service provider about the details of an ongoing facsimile call in pass through mode. Advantageously, this can provide usage information, quality of transmission information, billing information and other useful information.

15 Claims, 2 Drawing Sheets

METHOD FOR SIGNALING A FACSIMILE PASS THROUGH MODE OVER A VOIP VOICE SERVICE

BACKGROUND

1. Field

The present disclosure relates to a method for signaling a facsimile pass through mode over a VOIP voice service.

2. Introduction

Due to the advancement in high speed bandwidth transmission to home users, many cable operators and Passive Optical Network operators have chosen to provide Triple Play services (Voice, Video and Data services) over an IP backbone. For example, Verizon provides Triple Play services to its Gigabit Passive Optical Network (GPON) customers and uses Voice Over Internet Protocol (VOIP or Voice Over IP), Session Initiation Protocol (SIP) and Real Time Protocol (RTP) for voice services. Based on an end user needs, various types of Optical Network Terminals (ONT) are chosen.

SIP is used as a signaling protocol between Optical Network Terminals (ONTs) via the Optical Line Terminals (OLTs) and the endpoints are connected to the ports available in the Optical Network Terminals. Verizon supports Class-5 supplementary services for voice.

When using a facsimile pass through mode of signaling over VOIP voice service in ONTs, there is a need for using SIP signaling to indicate a facsimile pass through, rather than indicate a two way call.

The following steps show how the FAX Pass thru mode is typically chosen: First, User A goes off hook and dials User B's number. This information gets passed to User B via SIP signaling from one ONT device to another via Optical Line Terminals (OLT).

Next, User B is alerted and goes off hook and answers the call. Both Users A and B use a vocoder, such as G711U codec, via SDP negotiation done via INVITE-200 OK-ACK messages.

Next, according to "draft-ietf-sipping-realtimefax-01.txt" and "draft-mule-sip-t38callflows-01.txt", User B would send a re-INVITE request back to User A requesting codec T.38 only if it supports it. But, in the case where User B does not support the T.38 codec, it would stay with the already negotiated codec G711U codec.

And next, when User A sends a fax detect tone, User B detects it and starts the fax reception. But, user A is not notified that the fax tone is detected and therefore, the call status of User A as seen on Network switching device OLT (Optical Line Termination) is "2 way" instead of a "fax call". This is a problem with facsimile communications in connection with OLTs and ONTs.

Therefore, when it comes to billing the caller for a "fax call" made, the status of this call would be shown as a "2way" call instead of a "fax call". Applicant is not aware of a solution provided in relevant standards for a method for signaling a facsimile pass through mode over a VOIP voice service.

There is yet a further need to provide enhanced tracking of calls, for enhancing usage information, quality of service and improved billing, which can use many components already found in communication systems utilizing VOIP voice service. Thus, a method that addresses these issues and problems would be considered an improvement in the art.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1:
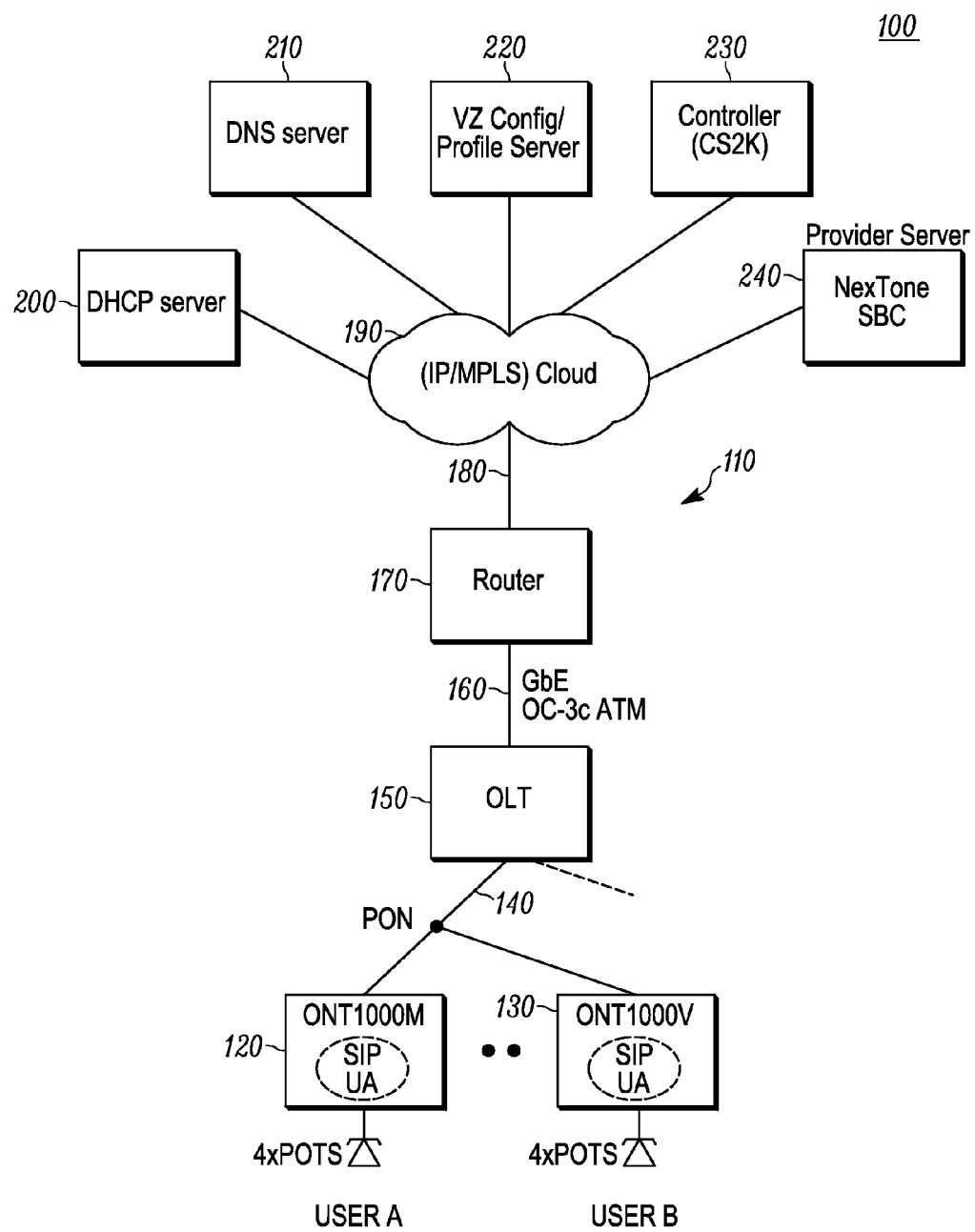
FIG. 1 is an exemplary block diagram of a communication system according to one embodiment.

FIG. 1 is an exemplary block diagram of a system 100 according to one embodiment. The system 100 can include a network 110, a session initiation protocol user agent (SIP UA) terminals 120 and 130, shown as User A and User B, Passive Optical Network (PON) line 140. The line 140 is connected to an OLT 150. The network includes a PON line 160 connecting OLT 150 and router 170. PON line 180 connects the router 170 with a cloud 190, such as an IP/MPLS cloud. The cloud 190 can be connected to and include a plurality of servers, such as a Dynamic Host Configuration Protocol (DHCP) Server 200, a Dynamic Name System (DN) Server 210, Profile Server 220, Controller 230, such as a Nortel CS2K switch, and Provider Server 240. As should be understood, various servers, routers, switches, controllers, network equipment and the like, can be used as desired.

For example, in one embodiment, the Controller 230 can be a switch which does call control signaling and routing such as a Nortel CS2K switch, and the Provider Server 240 can be a NexTone server. The network 110 may be hardwired, a wireless telecommunications network or a hybrid of both, and can include a cellular telephone network, a Time Division Multiple Access (TDMA) network, a Code Division Multiple Access (CDMA) network, Global System for Mobile Communications (GSM), a Third Generation (3G) network, a Fourth Generation (4G) network, a satellite communications network, and other like communications systems. More generally, network 110 may include a Wide Area Network (WAN), a Local Area Network (LAN) and/or a Personal Area Network (PAN). Furthermore, the network 110 may include more than one network and may include a plurality of different types of networks. Thus, the network 110 may include a plurality of data networks, a plurality of telecommunications networks, a combination of data and telecommunications networks and other like communication systems capable of sending and receiving communication signals. In operation, the terminals 120 and 130 can communicate with the network 110 and with other devices on the network 110 by sending and receiving wireless signals, via line 140, which may also comprise local area, and/or personal area access points.

Figure 2:
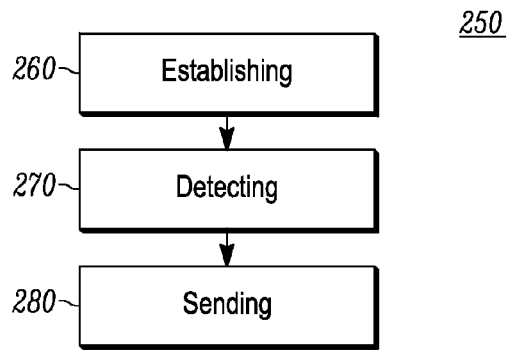
FIG. 2 is an exemplary block diagram of a method for signaling a facsimile pass through mode over a VOIP voice service according to one embodiment.

FIG. 2 is an exemplary block diagram of a method for signaling a facsimile pass through mode over a voice over internet protocol voice service. The method 250 includes: establishing 260 a voice over internet protocol call; detecting 270 that a facsimile tone has been received by a sender; and sending 280 a facsimile pass through notify message, from the sender, in response to detecting that the facsimile tone has been received. Advantageously, the method 250 can be adapted to inform the voice over internet protocol service provider about the details of an ongoing facsimile call in pass through mode. Currently, Applicant is not aware of a method in voice over internet protocol based communication to inform that the "fax tone detect" successfully occurred on the sender and receiver. Advantageously, this can provide usage information, quality of transmission information, billing information and other useful information to a service provider, for example.

In one embodiment, the step of establishing a voice over internet protocol call includes being between the sender and a receiver, the sender and receiver comprise optical line terminals.

In one case, the facsimile tone is compatible and in compliance with facsimile standards and is sent by a sender to a receiver prior to providing a facsimile payload. In a preferred embodiment, the step of sending a facsimile pass through notify message is sent to at least one of a receiver and controller, which allows a service provider to appropriately track facsimile usage information and billing. In more detail and stated differently, a SIP based event notification mechanism is provided, for informing the fax tone detect event back to the caller, as the structure and framework for doing this is supported in many conventional networks and is easily deployable. In yet more detail, in a preferred embodiment, the method further comprises receiving an acknowledgement from a controller, after the step of sending a facsimile pass through notify message for appropriate acknowledgement.

Figure 3:
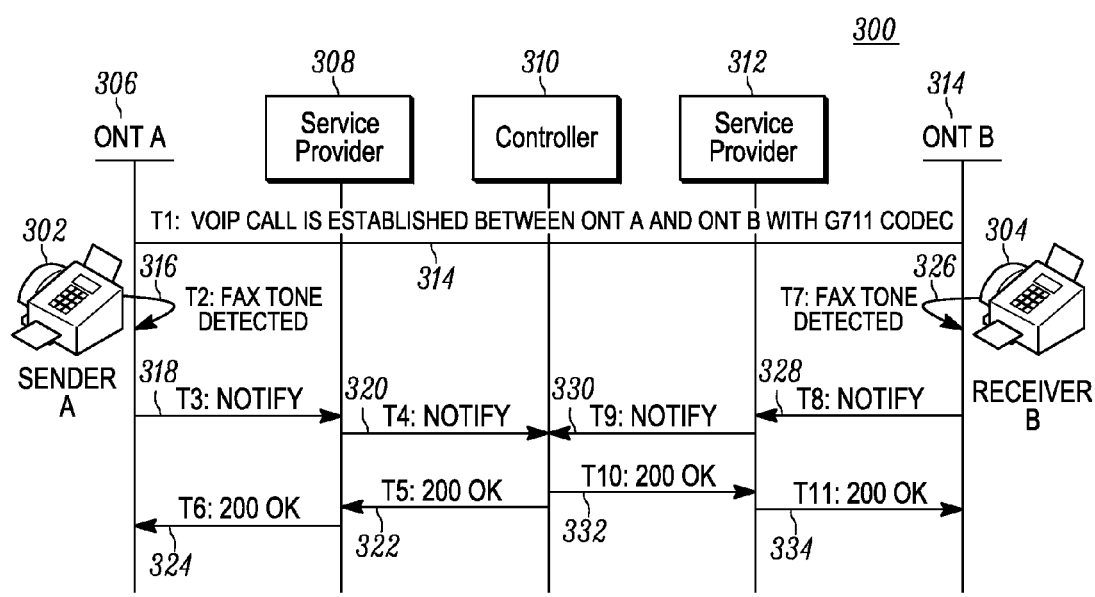
FIG. 3 is an exemplary ladder diagram of a method for signaling a facsimile pass through mode over a VOIP voice service according to one embodiment.

In a preferred embodiment, a method for signaling a facsimile pass through mode over a voice over internet protocol voice service is disclosed, as in FIGS. 2 and 3. The method 250 can include: establishing 260 a voice over internet protocol call between a sender and a receiver; detecting 270 that a facsimile tone has been received by a sender; sending 280 a facsimile pass through notify message 318, from the sender 302, in response to detecting that the facsimile tone has been received; detecting that a second facsimile tone has been received by a receiver 304 from the sender 302; and sending a second facsimile pass through notify message, from the receiver 328, in response to detecting that the second facsimile message has been received. In conventional systems, in a facsimile call in pass through mode, the protocol messages exchanged to establish this call do not carry any information to identify that this is a facsimile call. Advantageously, this method 250 provides information to the service provider 308 and 312 about the ongoing facsimile call even if it is in pass through mode, which in conventional systems are not be detected by the service provider. Beneficially, this approach can be adapted to ensure quality of service and reliability of facsimile calls being adjusted and fine tuned for a customer/user, and provides clarity in the billing information for the voice over internet protocol calls made by a sender and receiver.

In a preferred embodiment, the step of establishing 360 a voice over internet protocol call includes being between the sender 302 and the receiver 304 with a vocoder, the sender 302 and the receiver 304 comprise optical line terminals 306 and 314.

Also in a preferred embodiment, the step of sending a facsimile pass through notify message T3 318 and T4 320 is sent to a controller 310 and includes at least one of usage information and billing information. Further, an receiving an acknowledgement T5 322 and T6 324 is received by ONT A 306, from a controller 310 and service provider 308, after the step of sending a facsimile pass through notify message 320.

A detailed process is provided below.

Example One

Referring to FIG. 3, a ladder diagram 300 is shown. It generally details a SIP based event notification mechanism for informing that a fax tone detect event has occurred and acknowledging and confirming that it has occurred back to a caller. At T1 314 a SIP VOIP call is established between ONT-A 306 and ONT-B 314 with Codec G711 pass through. At T2 Fax Tone Detected 316 a fax tone is detected on ONT A 306. At T3 Notify 318, ONT A 306 sends a SIP notify message with a header event: fax-passthru-notify and with a message body as "x event: fax-passthru-notify". At T4 Notify 320, this notify message T3 318, gets forwarded by Provider/SBC 308, to the Controller 310 or actual switch which does the call control signaling. This message is stored by the switch and the call is marked as a fax call with type pass thru.

At T5 200OK 322, the Controller 310 (switch) sends a 200 OK back to the Provide/SBC 308, as an acknowledgement that it received the notify message. At T6 200OK, the T5 322 message is forwarded by Provider 308 back to the ONT-A 306.

Thus, when the "fax" tone is detected during T1 314, by for example, Vinetic hardware in receiver 304, it informs the Telephony Hardware Device driver about the event notification. This can provide POTS access which can include a Codec/DSP and SLICs (Telephony Hardware Interface). This event gets propagated to the SIP (Session Initiation Protocol) Layer and thereby a SIP NOTIFY T3 318 message can be sent to a peer (caller) with a content type as "message/sipfrag" and a field containing "X fax-passthru-notify". T5 322 and T6 324 200 OK SIP acknowledgement message would be transparently forwarded by the Network proxy servers back to ONT A 306 and sender A 302 would receive a confirmation that this "message/sipfrag" message and change its mode from "2 way" call to "fax call". Sender A 302 can then send an SIP 200 OK message back to Receiver B 314. It is noted, that there are two different tones one from Receiver B 304 for triggering T2 316 and progressing from T2-T6 items 316, 318, 320, 322 and 324, and a second tone detected at T7 326 from Sender A 302 to progress from T8 to T11, items 328, 330, 332 and 334.

T1 serves as the underlying basic call flow path in connection with a PCMY (G711U) codec negotiation for the FAX call to start and for all the steps T2 to T11. It should also be noted, that T3-T6 and T8-T11 need to track each other. That is because, these are not a part of the FAX call, but rather a Notification the service provider 308 and 313 that the ongoing call is a FAX call. Continuing, at T7 326 a fax tone is detected on ONT B 314.

At T8 Notify 328 ONT B 314 sends a SIP notify message with the header event: fax-passthru-notify and with message body as "x event: fax-passthru-notify". At T9 Notify 330, the T8 Notify 328 message gets forwarded by Service Provider 312 to the Controller 310, a switch which does the call control signaling and routing. The TP Notify 330 message is stored by a switch in Controller 310 and the call is marked as a fax call with type pass thru.

At T10 200 OK 332, the Controller 310 sends a 200 OK message back to the Service Provider 312 as an acknowledgement that it received the notify message. And at T11 200 OK 334, the 200 OK is forwarded by Service Provider 312 back to the ONT B 314. It is noted that T7 326 can occur anytime between T2 316 and T6 324, and the ladder diagram timing of T7-T11 may be modified or delayed from what is shown in FIG. 3.

The method 250 is preferably implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

I claim:

1. A method for signaling a facsimile pass through mode over a voice over internet protocol voice service, comprising:
   establishing via a pass through codec a voice over internet protocol call between a first optical network terminal associated with a sender and a second optical network terminal associated with a receiver;
   in response to detection of a facsimile tone at the sender, receiving a facsimile pass through notify message sent from the first optical network terminal to a server of a voice over internet protocol voice service provider,
   forwarding to a controller that manages call control signaling and routing for the voice over internet protocol service provider a notification of a facsimile pass through notify event, as indicated by the first optical network terminal's facsimile pass through notify message, for identification at the controller of the voice over internet protocol call as a fax call with a type pass through;
   receiving from the controller an acknowledgement that the controller received the notification of the facsimile pass through notify event as indicated by the first optical network terminal;
   forwarding the acknowledgement by the controller back to the first optical network terminal that a fax tone detect event has occurred for causing a change in a mode at the first optical network terminal to a fax call, wherein the acknowledgement by the controller triggers a notification from the first optical network terminal to the second optical network terminal for detection by the second optical network terminal of the fax tone;
   in response to detection of a facsimile tone at the receiver, receiving a facsimile pass through notify message sent from the second optical network terminal;
   forwarding to the controller that manages call control signaling and routing for the voice over internet protocol service provider a notification of a facsimile pass through notify event, as indicated by the second optical network terminal's facsimile pass through notify message, for identification at the controller of the voice over internet protocol call as a fax call with a type pass through;
   receiving from the controller an acknowledgement that the controller received the notification of the facsimile pass through notify event as indicated by the second optical network terminal; and
   forwarding the acknowledgement by the controller back to the second optical network terminal that the fax tone detect event has occurred.

2. The method of claim 1, wherein the codec is G711 pass through codec and the pass through notify messages are Session Initiation Protocol (SIP) messages.

3. The method of claim 1, wherein the first optical network terminal, upon receiving acknowledgement that the fax tone is detected, the status of the sender is updated to reflect a facsimile call.

4. The method of claim 1 wherein the facsimile tone comprises being in compliance with a facsimile standard.

5. The method claim 1, further comprising sending the facsimile pass through notify messages to a controller.

6. The method claim 5 wherein the facsimile pass through notify message includes at least one of usage information and billing information.

7. The method claim 1 further comprising receiving an acknowledgement from a controller after sending the facsimile pass through notify message.

8. The method claim 1 wherein sending a facsimile pass through notify message includes a payload including message/sipfrag and a field including fax-passe thru-notify.

9. A method for signaling a facsimile pass through mode over a voice over internet protocol voice service, comprising:
   establishing via a pass through codec a voice over internet protocol call between a sender and a receiver;
   receiving a first facsimile pass through notify message, from the sender, in response to detecting that the facsimile tone has been received to a server of a voice over internet protocol voice service provider;
   forwarding to a controller that manages call control signaling and routing for the voice over internet protocol service provider a notification of a facsimile pass through notify event, as indicated by the sender's facsimile pass through notify message, for identification at the controller of the voice over internet protocol call as a fax call with a type pass through;
   receiving from the controller an acknowledgement that the controller received the notification of the facsimile pass through notify event as indicated by the sender;
   forwarding the acknowledgement by the controller back to the sender that a fax tone detect event has occurred for causing a change in a mode at the sender to a fax call, wherein the acknowledgement by the controller triggers a notification from the sender to the receiver for detection by the second optical network terminal of the fax tone;

receiving a second facsimile pass through notify message, from the receiver, in response to detecting that the second facsimile tone has been received, forwarding to the controller that manages call control signaling and routing for the voice over internet protocol service provider a notification of a facsimile pass through notify event, as indicated by the receiver's facsimile pass through notify message, for identification at the controller of the voice over internet protocol call as a fax call with a type pass through;

receiving from the controller an acknowledgement that the controller received the notification of the facsimile pass through notify event as indicated by the receiver; and forwarding the acknowledgement by the controller back to the receiver that the fax tone detect event has occurred.

10. The method of claim 9, wherein establishing a voice over internet protocol call includes being between the sender and the receiver with a vocoder, the sender and the receiver comprising optical line terminals.

11. The method claim 9 wherein sending a facsimile pass through notify message is sent to a controller and includes at least one of usage information and billing information.

12. The method claim 9 further comprising receiving an acknowledgement from a controller after sending the facsimile pass through notify message.

13. The method claim 9 wherein sending a facsimile pass through notify message is sent to a least one of the sender and receiver.

14. The method of claim 9, wherein the codec is G711 pass through codec and the pass through notify messages are Session Initiation Protocol (SIP) messages.

15. The method of claim 9, wherein the first optical network terminal, upon receiving acknowledgement that the fax tone is detected, the status of the sender is updated to reflect a facsimile call.

* * * * *